United States Patent
Tritschler et al.

(10) Patent No.: US 10,367,363 B2
(45) Date of Patent: Jul. 30, 2019

(54) DEVICE FOR CHARGING AN ENERGY STORE

(71) Applicant: Fraunhofer-Gesellschaft zur Foerderung der angewandten Forschung e.V., Munich (DE)

(72) Inventors: Johannes Tritschler, Hartheim (DE); Stefan Reichert, Freiburg (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 301 days.

(21) Appl. No.: 15/448,820

(22) Filed: Mar. 3, 2017

(65) Prior Publication Data

US 2017/0179745 A1    Jun. 22, 2017

Related U.S. Application Data

(63) Continuation of application No. PCT/EP2015/070139, filed on Sep. 3, 2015.

(30) Foreign Application Priority Data

Sep. 4, 2014  (DE) .................. 10 2014 217 703

(51) Int. Cl.
*H02J 7/00* (2006.01)
*H02J 9/00* (2006.01)
(Continued)

(52) U.S. Cl.
CPC ............ *H02J 7/0055* (2013.01); *B60L 53/11* (2019.02); *B60L 53/14* (2019.02); *B60L 53/22* (2019.02);
(Continued)

(58) Field of Classification Search
USPC .............. 320/104, 107, 109; 307/44, 56, 64
See application file for complete search history.

(56) References Cited

U.S. PATENT DOCUMENTS 6,476,571 B1    11/2002  Sasaki
2012/0062027 A1*  3/2012  Domoto ................. B60K 6/46
                                                   307/9.1
(Continued)

FOREIGN PATENT DOCUMENTS

DE    102011075927 A1    11/2012
DE    102012206801 A1    10/2013
(Continued)

OTHER PUBLICATIONS

Christen, D. et al., "Highly Efficient and Compact DC_DC Converter for Ultra-Fast Charging of Electric Vehicles", ETH Zuerich, 15th International Power Electronics and Motion Control Conference, EPE-PEMC 2012 ECCE Europe, Novi Sad, Serbia, 2012, 8 pages.
(Continued)

*Primary Examiner* — Richard Isla
*Assistant Examiner* — Mohammed J Sharief
(74) *Attorney, Agent, or Firm* — Perkins Coie LLP; Michael A. Glenn

(57) ABSTRACT

What is shown is a device for charging an energy store having a first terminal for connecting to a direct current source, a second terminal for connecting to the energy store, and a parallel connection between the first and second terminals, the parallel circuit having an intermediate connection circuit, a first transducer circuit for converting an input voltage and an input current to an output direct voltage and an output direct current, and a second transducer circuit.

8 Claims, 7 Drawing Sheets

(51) Int. Cl.
*H02J 7/02* (2016.01)
*B60L 53/14* (2019.01)
*B60L 53/22* (2019.01)
*B60L 53/24* (2019.01)
*B60L 53/10* (2019.01)

(52) U.S. Cl.
CPC .............. *B60L 53/24* (2019.02); *H02J 7/022* (2013.01); *B60L 2210/10* (2013.01); *B60L 2210/30* (2013.01); *B60L 2210/40* (2013.01); *B60L 2220/54* (2013.01); *H02J 2007/0059* (2013.01); *Y02T 10/641* (2013.01); *Y02T 10/7005* (2013.01); *Y02T 10/7072* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01)

(56) References Cited

U.S. PATENT DOCUMENTS

| | | | |
|---|---|---|---|
| 2012/0286740 A1 | 11/2012 | Loudot et al. | |
| 2012/0319495 A1 | 12/2012 | Muller et al. | |
| 2013/0193922 A1* | 8/2013 | Park | B60L 3/00 320/109 |
| 2013/0249295 A1 | 9/2013 | Hsieh et al. | |
| 2014/0232301 A1 | 8/2014 | Dittmer et al. | |

FOREIGN PATENT DOCUMENTS

| | | |
|---|---|---|
| DE | 102014101610 A1 | 8/2014 |
| EP | 2114714 B1 | 10/2013 |
| JP | 08256405 A | 10/1996 |
| JP | 8275306 A | 10/1996 |
| JP | 2000324857 A | 11/2000 |
| JP | 2004519593 A | 7/2004 |
| JP | 201051092 A | 3/2010 |
| JP | 2011526775 A | 10/2011 |
| JP | 2012085535 A | 4/2012 |
| JP | 2012135141 A | 7/2012 |
| JP | 2012196105 A | 10/2012 |
| JP | 2013102586 A | 5/2013 |
| JP | 2013521750 A | 6/2013 |
| JP | 2014524731 A | 9/2014 |

OTHER PUBLICATIONS

Eckardt, B. et al., "Automotive Powertrain DC/DC Converter With 25k W/dm^3 by Using SiC Diodes", Fraunhofer Institut of Integrated Systems and Device Technology (IISB), Erlangen (to follow), 6 pages.

Khan, Mehnaz A. et al., "Integrated Electric Motor Device and Power Electronics for Bidirectional Power Flow Between the Electric Vehicle and DC or AC Grid", North Carolina State University, Raleigh, NC, USA and Yilmaz Sozer, University of Akron, OH, USA, IEEE Transactions on Power Electronics; vol. 28, No. 12, Dec. 2013, 2 pages.

* cited by examiner

DEVICE FOR CHARGING AN ENERGY STORE

CROSS-REFERENCE TO RELATED APPLICATIONS

This application is a continuation of copending International Application No. PCT/EP2015/070139, filed Sep. 3, 2015, which is incorporated herein by reference in its entirety, and additionally claims priority from German Application No. 10 2014 217 703.0, filed Sep. 4, 2014, which is also incorporated herein by reference in its entirety.

BACKGROUND OF THE INVENTION

The present invention relates to a device for charging an energy store. Embodiments describe a combined AC-DC quick charge system.

If both ways of charging, that is AC and DC charging, are to be available optionally in a vehicle, this is ideally realized using a combined vehicle plug device allowing both AC and DC charging. A (single-phase or three-phase) AC charger is usually installed within the vehicle and, with optional DC charging, the DC charger is connected directly to the battery of the vehicle. It is disadvantageous here that the charging process, with direct coupling to the battery, is limited in power due to the battery voltage and the limited current-carrying capacity of charge-plug devices available nowadays. This disadvantage can be eliminated by using a DC/DC transducer within the vehicle, however, additional costs and complexity for elements result. Well-known charging devices are described in DE 10 2011 075 927 A1 and DE 10 2012 206 801 A1.

Further charging devices are shown in [1], [2] and [3]. [1] shows a stationary high-power DC/DC transducer. Additionally, a DC/DC transducer and a DC/AC converter which, however, remain unused when charging, are located within the vehicle. [2] shows a motor converter comprising a boost converter, wherein the DC/DC transducer is also used as a buck converter of the voltage of a DC bus to the battery voltage. [3] shows a concept where a three-phase motor converter and the motor inductances can be used as DC/DC transducer, motor converter or two-phase AC charger. The different modes of operation may be selected using a plurality of switches and combinations of switch positions.

EP 2114714 B1 shows a drive system of a hybrid vehicle comprising a motor and an electric motor which supplies the vehicle with energy. In addition, the drive system comprises a first device for storing energy and a second device for storing energy, each storing electrical energy. A power transducer influences the power exchange between the first device for storing energy and the second device for storing energy. In addition, the power transducer comprises an electronic control unit which monitors the charge state of the first device for storing energy and the second device for storing energy. In addition, the second device for storing energy may be operated by means of a direct or alternating voltage, wherein additional power switches for a bridge circuit are necessitated for an alternating voltage operation (compared to direct voltage operation).

SUMMARY

According to an embodiment, a device for charging an energy store may have: a first terminal for connecting to a direct current source; a second terminal for connecting to the energy store; a third terminal for connecting to an alternating current source; and a parallel connection between the first and second terminals, the parallel connection having an intermediate connection circuit, a first transducer circuit for converting an input voltage and an input current to an output direct voltage and an output direct current, and a second transducer circuit; wherein the first transducer circuit has an AC/DC transducer having a switch connected between a main choke and a grid choke of the AC/DC transducer; wherein the switch is configured to separate the grid choke from the main choke and to connect the main choke to the second terminal in a direct current charge mode; and wherein the AC/DC transducer has a series connection of the grid choke, the switch and the main choke, and wherein the grid choke is connected to the third terminal; wherein the second transducer circuit has a DC/DC transducer.

According to another embodiment, a device for charging an energy store may have: a first terminal for connecting to a direct current source; a second terminal for connecting to the energy store; and a parallel connection between the first and second terminals, the parallel connection having an intermediate connection circuit, a first transducer circuit for converting an input voltage and an input current to an output direct voltage and an output direct current, and a second transducer circuit; wherein the first transducer circuit has a motor and a switch configured to connect the winding of the motor to the second terminal in a direct current charge mode; wherein the second transducer circuit has a DC/DC transducer; wherein the winding of the motor forms a main choke of the first DC/DC transducer.

Embodiments provide a device for charging an energy store comprising a first terminal for connecting to a direct current source, a second terminal for connecting to the energy store, and a parallel connection between the first and second terminals, the parallel connection comprising an intermediate connection circuit, a first and a second transducer circuit.

The invention is based on the finding that, when connecting a direct voltage source to two transducer circuits connected in parallel, a charging power of an energy store which is connected to the output of the transducer circuits can be increased. A higher charging power may be of advantage to be able to charge a car battery quicker, for example.

In accordance with another embodiment, the device may comprise a third terminal for connecting to an alternating current source. The first transducer circuit may comprise an AC/DC transducer having a switch connected between a main choke and a grid choke of the AC/DC transducer, wherein the AC/DC transducer is connected to the third terminal, and wherein the switch is configured to separate the grid choke from the main choke and to connect the main choke to the second terminal in a direct current charge mode. Additionally, the device may comprise an alternating current charge mode where the switch is configured to connect the grid choke and the main choke and to separate the main choke from the second terminal. This is of advantage in that an AC charge system present in the electromobile, for example, may also be utilized for DC charging with little modification.

In accordance with another embodiment, the first DC/DC transducer may comprise a motor the winding of which forms a main choke of the first DC/DC transducer, and comprising a switch configured to connect the main choke to the second terminal in a direct current charge mode. The switch may be configured to separate the motor from the second terminal in a motor operating process. In addition, the first DC/DC transducer may comprise a bridge circuit between the intermediate connection circuit and the main choke, which may, for example, also serve as a drive converter. In one embodiment, the motor may be the drive motor of an electromobile.

The double usage of a charger for AC or DC charging is of advantage since, by only very little additional expenditure, AC chargers may also be used for DC charging and, equally, a DC charger may also be used as an AC charger, thereby achieving considerable savings in cost and devices when compared to two separate systems for AC and DC charging. In addition, the current-carrying capacity and, thus, the power transferred can be increased considerably without considerable additional expenditure in the case of DC charging. Additionally, when using a motor converter comprising a DC/DC transducer for DC charging, a very high power can be transferred without having to integrate an additional charger in the vehicle.

In accordance with another embodiment, the first and second transducer circuits may be configured to perform multi-phase processing of a charge current of the direct current source.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
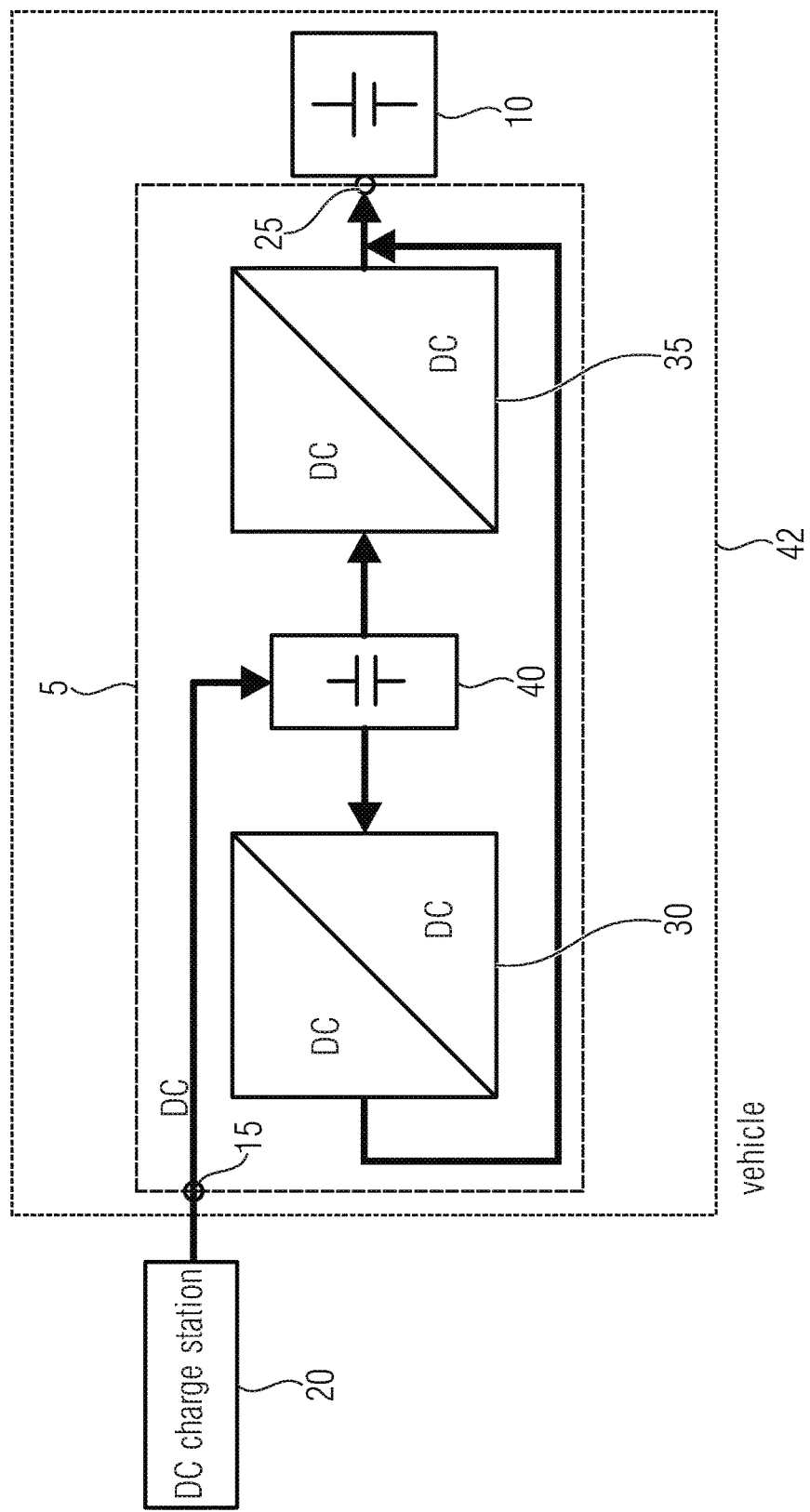
FIG. 1 is a schematic block diagram of a device for charging an energy store.

In the following description of the Figures, equal elements or elements of equal effect will be provided with equal reference numerals so that the description thereof in the different embodiments is mutually exchangeable.

FIG. 1 shows a schematic block diagram of a charger 5 for charging an energy store 10 in accordance with an embodiment of the invention. A direct current source 20, like a DC charge station, is connected to a first terminal 15 of the device 5. In addition, the device 5 comprises a second terminal 25 to which the energy store 10 is connected. Furthermore, the charger 5 comprises two transducer circuits 30, 35 for converting an input voltage provided and an input current provided to an output direct voltage and an output direct current, and an intermediate connection circuit 40. In accordance with embodiments, the transducer circuits 30, 35 are DC/DC transducers configured to obtain a lower direct voltage and a higher direct current at the output of the circuit from the direct voltage and the direct current at the input of the circuit. The transducer circuits 30, 35 and the intermediate connection circuit 40 are connected in parallel to each other between the first and second terminals 15, 25.

By using two transducer circuits 30, 35 connected in parallel, the input power available may be used optimally for charging the energy store 10 by transforming the input voltage to the charge voltage of the energy store 10 by the transducer circuits 30, 35 and by transforming the input current intensity by the inverse of the voltage transformation ratio. The input power does not have to be limited (with a corresponding configuration of the elements and lines). This is necessitated when the charge voltage of the energy store 10 is smaller than the voltage of the direct current source 20 and the same is connected to the energy store 10 with no transducer circuit. The accelerated charge process of the energy store 10 is advantageous in this embodiment.

The charger 5 may be installed in a vehicle 42, such as an electromobile, together with the energy store 10, for example a battery or capacitor, wherein the first terminal 15 may be attached to an exterior of the vehicle for connecting the direct current source 20. However, the charger 5 is not limited to being used in the vehicle 42 but rather it may be used for charging any energy store. Of particular advantage is its usage in large-capacity energy stores, the charging process of which is to be accelerated by using a DC charge station.

Further embodiments of the present invention are discussed below, according to which the charge device may be used both for AC charging and DC charging of an energy store, for example of an electromobile.

Charging an electric vehicle battery may take place using a cable by means of (single-phase or three-phase) AC charging or DC charging. The electrical infrastructure in Germany (household connections) is typically of a three-phase character (3L+N) and reaches up to a power of 43 kW (400 V/63 A). DC charge systems necessitate a stationary external charge system and are typically used for higher charge powers at points suitable as regards traffic.

Charge powers of up to 107 kW (850 V/200) are theoretically possible at such quick charge stations using the existing vehicle plug devices. This can shorten the charge times considerably. In order to cover both charge variations, a so-called "combined AC/DC charging system" (CCS) has been introduced. It normalizes charge plugs, charge sockets and cable connections which can be used both for AC and DC charging.

The normalized DC plug connections available on the market (IEC Layer 62196-3) are limited to current-carrying capabilities of 200 A, which, with the voltages of conventional vehicle batteries (200-400 V) with direct coupling, results in a maximum transferable power of approximately 40 to 80 kW. Since an increase in coverage and, thus, capacity of the vehicle batteries will probably be necessitated in future, the charge power has to increase equally in order to keep the charge times within limits. In order to transfer higher DC charge powers, the voltage in the charge cable has to be increased due to the current being limited to 200 A. For adapting to the low battery voltages, this necessitates an adaptation stage (DC/DC transducer) within the vehicle, for example in the form of a buck converter.

Figure 2:
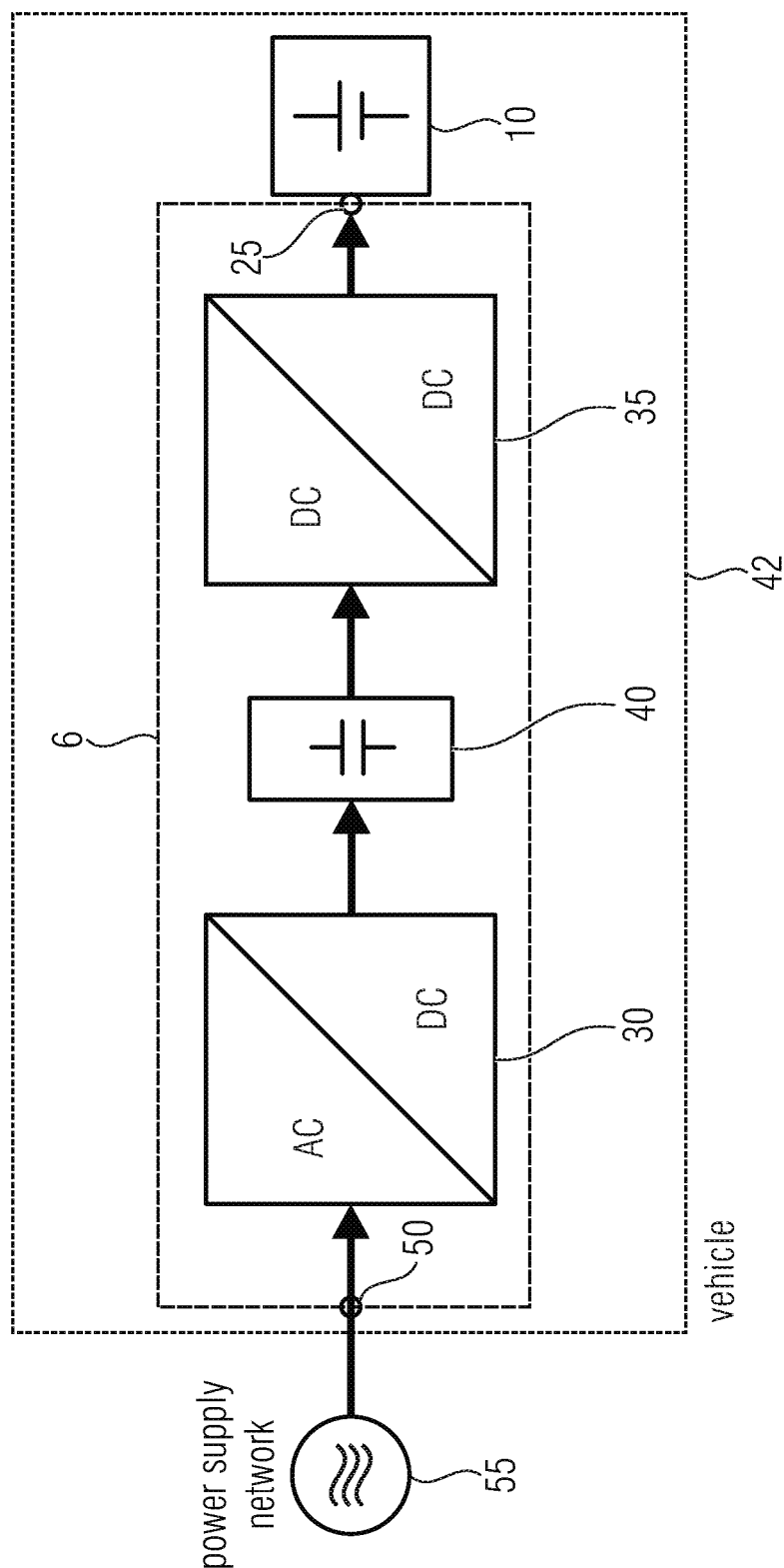
FIG. 2 is a schematic block diagram of a well-known alternating current charger.

In accordance with embodiments, a charger is used both for AC and DC charging of an electromobile. A known AC charger for an electromobile, for example a three-phase AC charger, is illustrated in FIG. 2. In addition, the AC charger may also be implemented as a single-phase, two-phase or multi-phase charger.

FIG. 2 schematically shows the vehicle 42 comprising the energy store 10, a third terminal 50 for connecting to the power supply network or grid 55 (AC source) and the charger 6. The charger 6 comprises the two transducer circuits 30, 35 for converting an input power to a direct power at the output. With the charger 6 shown, the first transducer circuit 30 comprises an inverter/rectifier (AC/DC transducer) and the second transducer circuit 35 comprises a DC/DC transducer. In addition, the intermediate connection circuit 40 is shown. The first and second transducer circuits 30, 35 and the intermediate connection circuit 40 are connected in series between the second and third terminals 25, 50. In accordance with embodiments, this known charger is modified in the way described below in greater detail so that a direct voltage connected to the DC intermediate circuit 40 is lowered and may be used for DC charging of the store unit, for example the energy store 10 (FIG. 1). Thus, at least one half-bridge and one choke made of the AC/DC transducer and the second DC/DC transducer are connected in parallel such that there are at least two parallel boost converters or buck converters. In order to maximize the transferable power for DC charging, all the power-electronical bridges and the chokes connected thereto are used in accordance with embodiments.

In accordance with embodiments, with DC charging, the intermediate connection circuit 40 of the AC charger is connected to an external DC voltage and the AC/DC transducer switched at its input filter and connected to the store unit 10 such that it has the function of a DC/DC transducer 30 of FIG. 1 which is operated in parallel to the second DC/DC transducer 35 existing already. Thus, using all the half-bridges and chokes, in DC charging at least double the power compared to AC charging is transferred.

With such a DC charging operation, the result is a power flow as is illustrated by the bold arrows in FIG. 1. Alternatively, in DC charge operation, only the switched AC/DC transducer (now effective as a DC/DC transducer) may be used, for example such that the power flow illustrated in FIG. 3 by the bold arrows results only via the transducer circuit 30.

Figure 3:
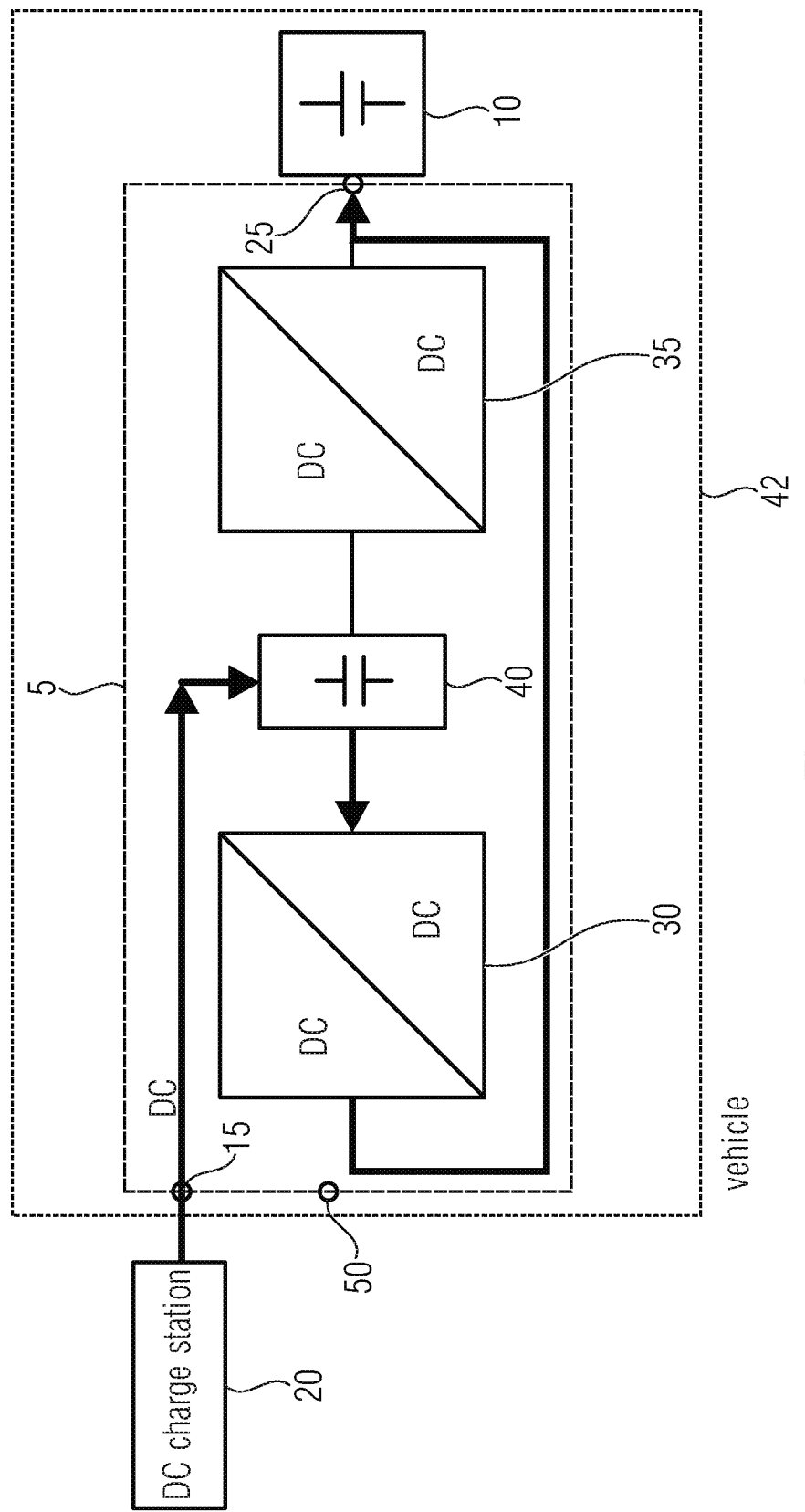
FIG. 3 is a schematic block circuit diagram of a device, similar to the embodiment of FIG. 1.

FIG. 3 additionally illustrates that the charger 5, apart from the AC terminal 50, also comprises the DC terminal 15 in order to apply the DC power to the intermediate connection circuit 40. The first transducer circuit 30 is used as an AC/DC transducer in AC operation and as a DC/DC transducer (buck converter) in DC operation.

In accordance with embodiments, the semiconductors and other components of the AC charge system present already in the vehicle are specifically utilized so that the complexity of elements and cost for a combined charge system is low. With a quasi-equal complexity, the system may be used for both AC and DC charging having a very high power and high inefficiency.

Figure 4:
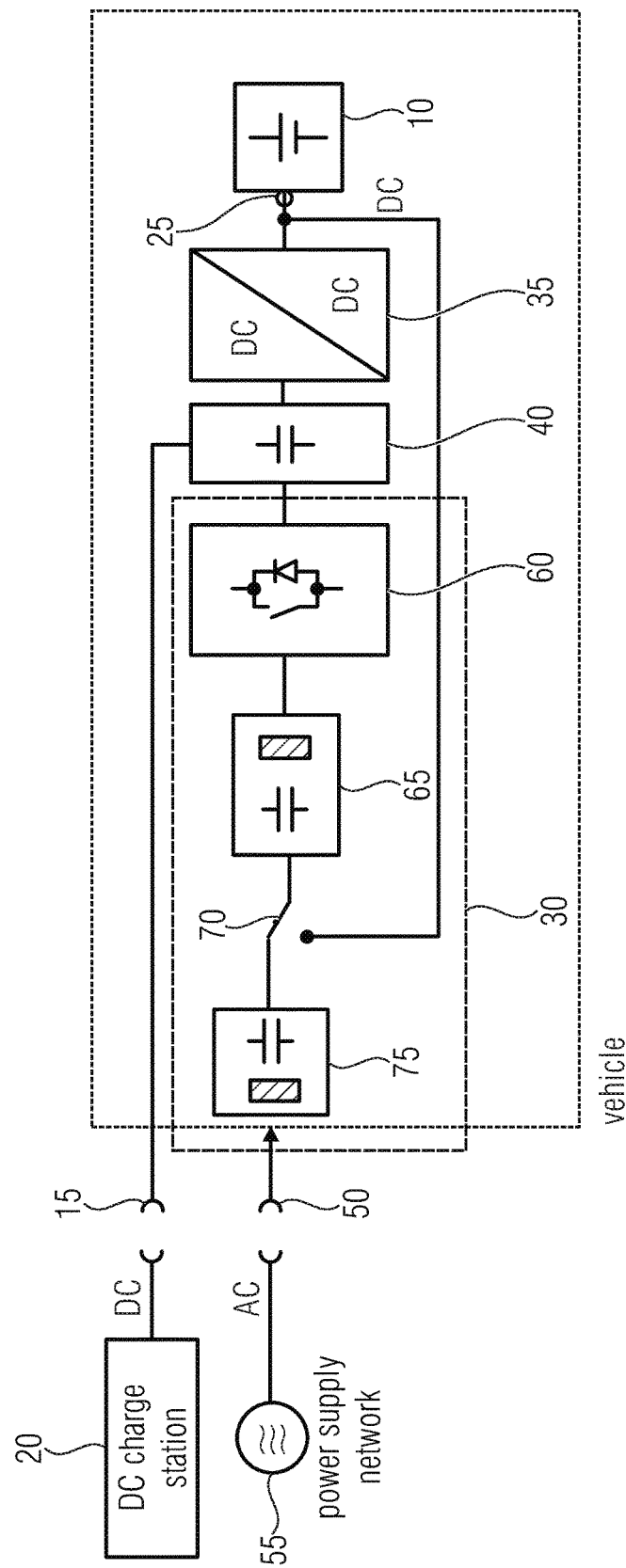
FIG. 4 is a schematic block circuit diagram of a device configured as a combined AC/DC charger.
Figure 5:
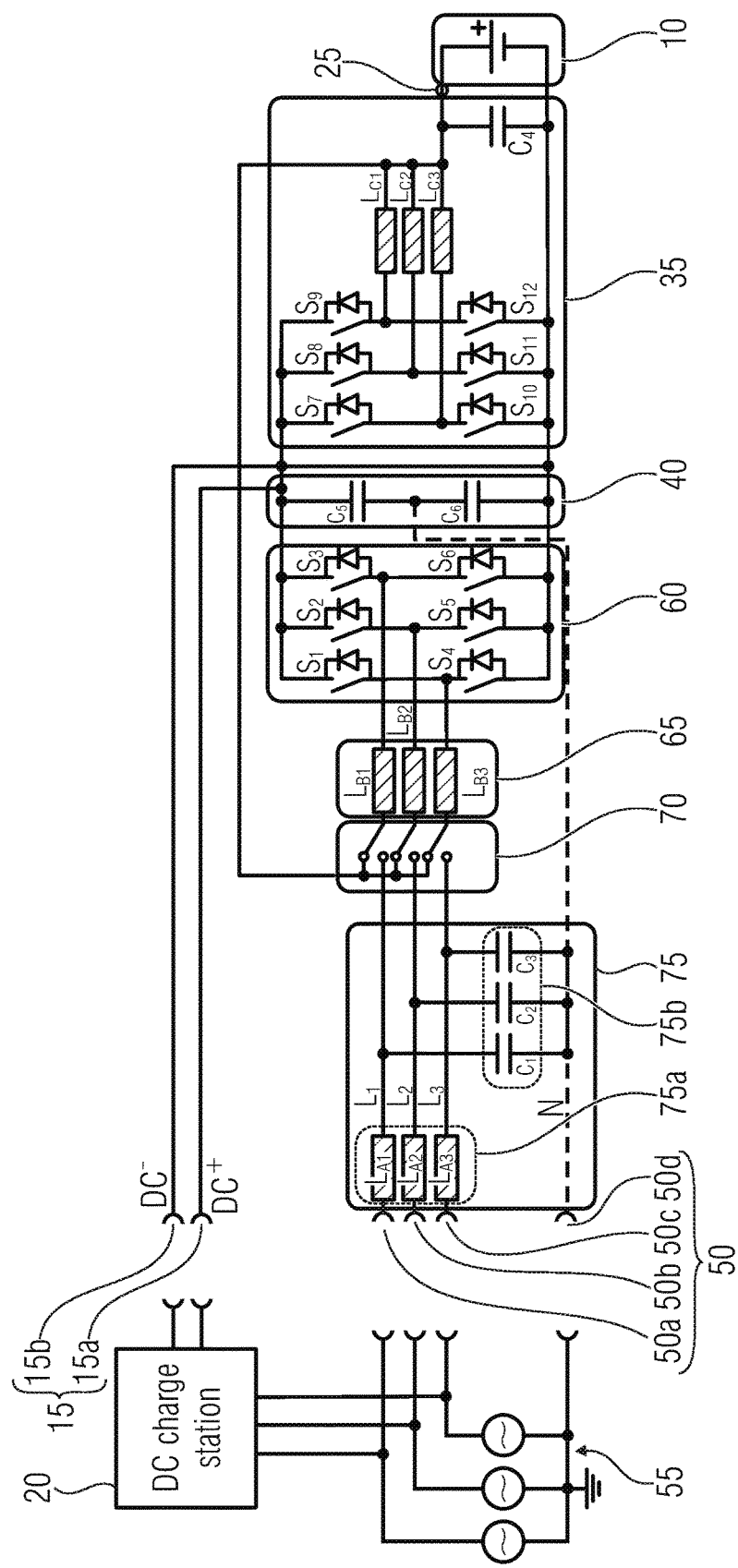
FIG. 5 is a schematic circuit diagram of a device configured as a combined AC/DC charger.

The embodiment of a combined AC/DC charge system is shown in FIGS. 4 and 5.

FIG. 4 shows a schematic block circuit diagram of the charger 5 configured as a combined AC/DC charger. In this embodiment, the power for the charger 5 may be provided by the alternating current source 55, for example the current supply network, or the direct current source 20 which is fed by the current supply network. As has been described already, the direct current source 20 is connected to the first terminal 15 or, alternatively, the alternating current source 55 is connected to the third terminal 50.

In a direct current charge mode, that is when the direct current source 20 is connected to the first terminal 15, the first transducer circuit 30 (first DC/DC transducer), the second transducer circuit 35 (second DC/DC transducer) and the intermediate connection circuit 40 form a parallel connection between the first terminal 15 and the second terminal 25 which the energy store 10 is connected to. The first transducer circuit 30 comprises a semiconductor switch 60, for example a bridge circuit, and a main choke 65 connected thereto. A switch 70 which electrically connects the main choke 65 and the second terminal 25 is connected to the main choke 65.

In an alternating current charge mode, the direct current source 55 is connected to the third terminal 50. The first transducer circuit 30 (AC/DC transducer), the intermediate connection circuit and the second transducer circuit 35 (DC/DC transducer) are connected in series between the third terminal 50 and the second terminal 25 which the energy store 10 is connected to. The AC/DC transducer comprises a series connection made up of the grid choke 75, the switch 70, the main choke 65 and the semiconductor switch 60. In the alternating current charge mode shown here, the switch 70, which, in the direct current charge mode shown before, has connected the main choke 65 to the second output 25, can be switched such that the grid choke 75 and the main choke 65 are connected to each other.

In other words, the combined charger suggested may comprise a storage unit, for example the energy store 10, a DC/DC transducer, for example the second transducer circuit 35, and an intermediate circuit, for example the intermediate connection circuit 40, active power-electronical switches, for example the semiconductor switch 60, such as a B6 bridge (3-Level-Topology) and a network-side filter which comprises the main choke 65 and the grid choke 75 and one or several change-over switches, such as the switch 70. The switch 70 is arranged between the filter elements 65, 75. Further embodiments where there is no main choke and/or grid choke 65, 75 are also feasible.

The grid choke 75 of the filter comprises a choke and, in this embodiment, capacitors. In the alternating current charge mode, the switch 70 connects the grid choke 75 (or filter elements in front of the switch 70) to the main choke 65 (or filter elements behind the switch 70) to each other. The total system may thus comprise an AC charge system comprising an input filter (main choke 65 and grid choke 75), a inverter, for example semiconductor switch 60, the intermediate connection circuit 40 and the second transducer circuit 35 (DC/DC transducer). In the case of DC charging, wherein a DC charge station, for example the direct current source 20, comprises a higher voltage than the voltage of the energy store 10, the switch 70 connects the main choke 65 to the energy store 10. The total system now present (in the direct current charge mode) has the function of one or several parallel buck converters.

FIG. 5 shows a schematic circuit diagram of the device 5 configured as a combined AC/DC charger. This embodiment shows a three-phase setup of the device 5. Further embodiments also allow a realization using one, two or any number of phases.

In the alternating current charge mode, the energy supply of the device 5 takes place using the alternating current source 55, in this embodiment a three-phase alternating current source connected to the poles 50a, 50b, 50c, 50d of the third terminal 50. Alternatively, the direct current source 20 may be connected to the poles 15a, 15b of the first terminal 15 when the charger 5 is operated in the direct current charge mode. As has been described, the direct current charge mode is realized using the parallel connection of the first and second transducer circuits 30, 35 and the intermediate connection circuit 40 connected in parallel between the first terminal 15 and the second terminal 25. The first transducer circuit 30 (DC/DC transducer) comprises the semiconductor switch 60 which is set up of a bridge of semiconductor switches $S_1$ to $S_6$, for example a B6 bridge. The semiconductor switches $S_1$ to $S_6$ are implemented as transistors, thyristors, or insulated gate bipolar transistors (IGBTs) for example. The main choke 65 which comprises three inductances $L_{B1}$, $L_{B2}$, $L_{B3}$ is connected to the center contacts of the B6 bridge. The three inductances may be implemented by coils. In addition, the three-phase switch 70 connects the outputs of the main choke 65 to the second terminal 25 of the device 5.

The second transducer circuit 35 (second DC/DC transducer) comprises the semiconductor switches $S_7$ to $S_{12}$ which in turn form a B6 bridge. In analogy to the first transducer circuit, the semiconductor switch may be implemented as a transistor, thyristor, or IGBT. Three coils having inductances $L_{C1}$, $L_{C2}$, $L_{C3}$, the output of which is connected to the second terminal 25 is connected to the center contacts of the B6 bridge circuit. Furthermore, a capacitor $C_4$ at the second terminal 25 is connected in parallel to the energy store 10. The capacitor $C_4$ can smooth a signal or signal flow of the parallel connection of the first and second transducer circuits 30, 35 and the intermediate connection circuit 40. The intermediate connection circuit 40 comprises a capacitor $C_5$ and a capacitor $C_6$. In further embodiments, other realizations of the intermediate connection circuit 40, the first DC/DC transducer 30 and the second DC/DC transducer 35 are also possible.

In the alternating current charge mode, the first transducer circuit 30 (AC/DC transducer) comprising the grid choke 75, the switch 70 and the main choke 65 is connected in series to the semiconductor circuit 60, the intermediate connection circuit 40 and the second DC/DC transducer 35 between the terminals 50 and 25 of the device 5. The poles 50a, 50b, 50c of the third terminal 50 guide the phases $L_1$, $L_2$ and $L_3$ of the alternating voltage source. In addition, pole 50d of the third terminal 50 guides the neutral conductor. The grid choke 75 comprises three lines inductors 75a $L_{A1}$, $L_{A2}$, $L_{A3}$, for example three coils or inductances, and three capacities 75b $C_1$, $C_2$, $C_3$, for example three capacitors. Each capacitor $C_1$, $C_2$, $C_3$, couples a respective one of the three phases $L_1$, $L_2$ and $L_3$ each to the neutral conductor N. The three-phase switch 70 connects the node between the coils and the capacitors to the main choke 65. The setup of the following components (main choke 65, semiconductor switch 60, intermediate connection circuit 40 and second DC/DC transducer 35) has been described already in the direct current charge mode. It is to be noted that the main choke 65 and the semiconductor switch 60 are operated in different directions in the alternating current charge mode and the direct current charge mode. In accordance with further embodiments, the semiconductor switches $S_1$ to $S_6$ and $S_7$ to $S_{12}$ may be controlled by separate control units or a common control unit.

Figure 7:
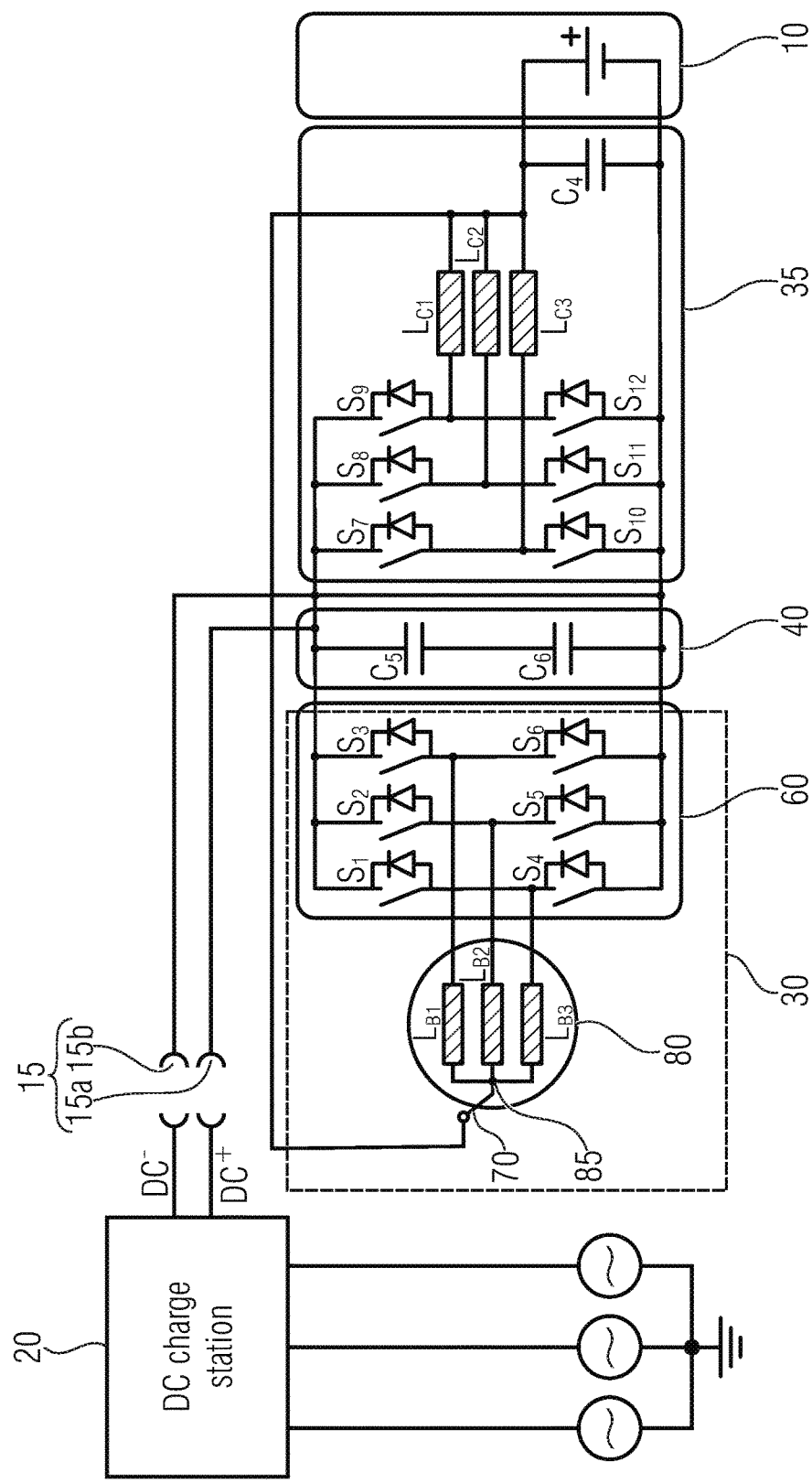
FIG. 7 is a schematic circuit diagram of the block circuit diagram shown in FIG. 6.

In other words, the LCL filter may be divided by the three-phase switch 70. The LCL filter comprises the grid choke 75a $L_{A1}$, $L_{A2}$, $L_{A3}$ and the capacitors 75b $C_1$, $C_2$, $C_3$ which form the grid choke 75 of the LCL filter, and the main chokes $L_{B1}$, $L_{B2}$, $L_{B3}$ which form the main choke 65. The switch 70 may divide the LCL filter between the grid chokes 75a and the main choke 65. The capacitors 75b may be arranged in front of or behind the switch 70. When the capacitors 75b are arranged behind the switch 70, in the direct current charge mode, they are applied in parallel to the energy store 10. Additionally, the circuit comprises three half bridges which are formed in the semiconductor switch 60, the intermediate connection circuit 40 and three buck converters connected in parallel (second transducer circuit 35), and the energy store 10. In FIG. 7, during the DC charge process, there are six parallel buck converters and, during the AC charge process, a three-phase AC charger comprising three parallel buck converters. The DC plus and DC minus inputs 15a, 15b may be connected directly to the intermediate circuit during the DC charge process.

Dimensioning

A three-phase transformer-free AC charger comprising an AC nominal power of 43 kW is assumed. In order to simplify the setup, it is practical to use two identical B6 bridge modules, one for the converter ($S_1$-$S_6$) and one for the multi-phase DC/DC adaptation stage ($S_7$-$S_{12}$).

With AC charging with a power of 43 kW, each bridge branch of the converter necessitates a current-carrying capability of 63 A. In order to optimally use the three bridge branches of the DC/DC adaptation stage ($S_7$-$S_{12}$) shown in the embodiment, a minimum battery voltage (voltage of the energy store 10) of 230 $V_{DC}$ would be conceivable ($I_{DC,max}$=3×63 A=189 A). The three buck converters may be clocked to be shifted in phase in order to minimize current ripples.

After switching to the DC charge operation, there are six parallel buck converters. The transferable DC charge power will then be more than 86 kW ($I_{DC,max}$6×63 A=378 A) with a battery voltage of 230 V, which corresponds to at least double the AC charge power possible.

When compared to a direct battery connection to the DC charge station, the transferable power in the embodiment shown may increase by approximately the factor 378 A/200 A=1.9, since the battery charge current is no longer directly dependent on the current-carrying capability (200 A) of the charge plug device. Since all of the semiconductor switches are active switches, the circuit is also bi-directional.

Alternative Embodiment

Figure 6:
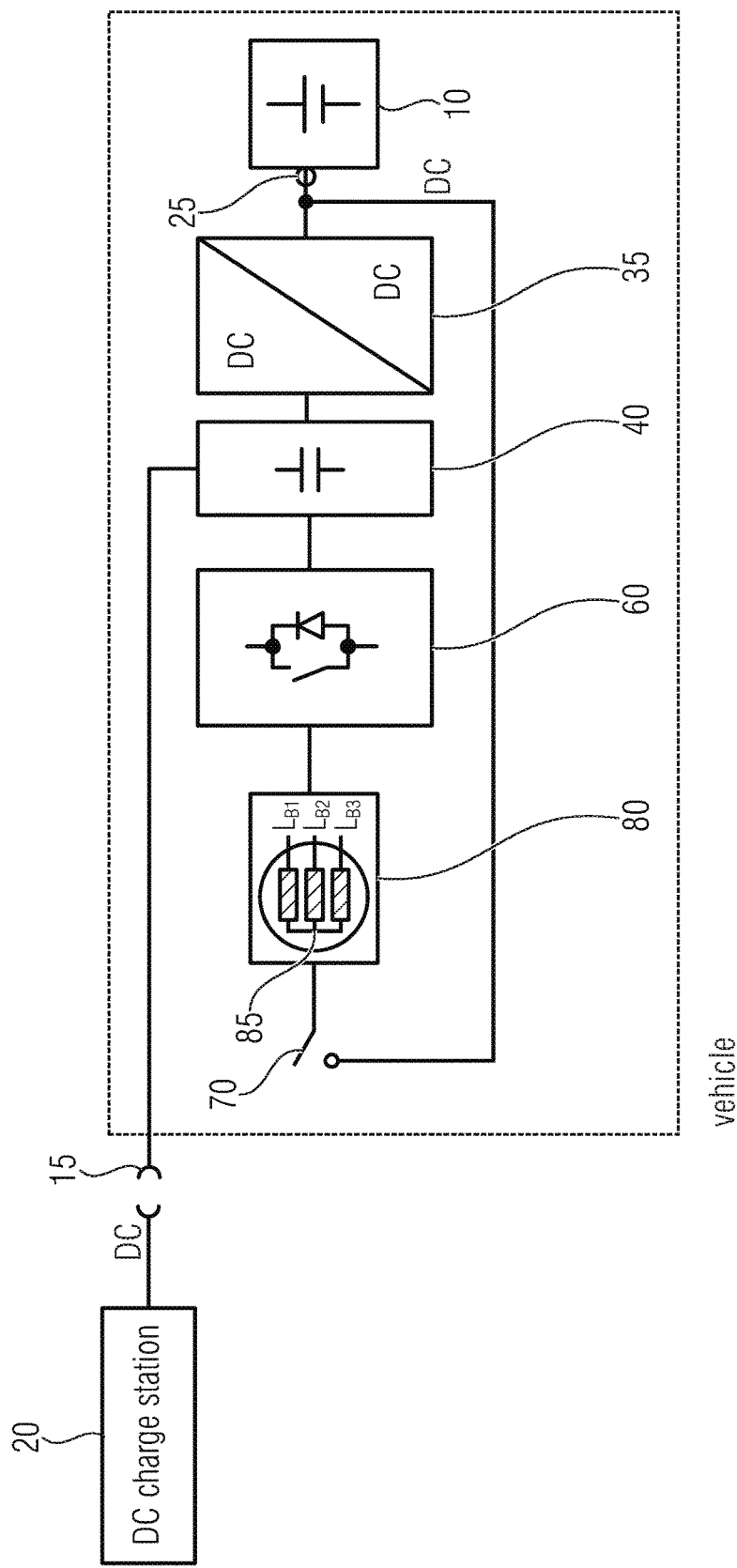
FIG. 6 is a schematic block circuit diagram of an alternative embodiment, wherein the main choke may be realized by at least one winding of an electric motor.

A further embodiment is shown in FIGS. 6 and 7. The function of the first transducer circuit in this embodiment is executed by an electric motor with a motor converter attached. In accordance with an embodiment, the electric motor is the drive motor of an electromobile.

FIG. 6 shows a schematic block circuit diagram of the further embodiment, wherein the main choke 65 from FIGS. 4 and 5 is realized by the windings/coils of an electric motor 80. The electric motor 80 comprises the three inductances $L_{B1}$, $L_{B2}$, $L_{B3}$ which allow three-phase processing (transformation) of the charge current in the branch of the first transducer circuit 30. In a motor operating mode, the switch 70 is open so that the electric motor 80 can be operated by the energy store 10. In addition, the switch 70 may be closed so that the star or neutral point 85 of the electric motor 80 is electrically connected to the second terminal 25.

FIG. 7 shows a schematic circuit diagram of the block circuit diagram shown in FIG. 6. When compared to the circuit shown in FIG. 5, the circuit in FIG. 7 differs in that there is no grid choke 75. The main choke 65 is substituted by the windings of the electric motor 80. In addition, the electric motor 80, with the input of the windings $L_{B1}$, $L_{B2}$, $L_{B3}$, is connected to the respective center contact of the three bridge branches 60. With the switch 70 closed, the star point 85 formed at the output of the windings $L_{B1}$, $L_{B2}$, $L_{B3}$ is connected to the second output 25. With the switch 70 open, the star point 85 is separated from the second output 25.

In other words, the embodiment in FIG. 7 describes a variation of the previous embodiment which, instead of an AC charger, uses a drive converter present, for example the semiconductor switch 60, including at least one three-phase bridge (B6, 3-Level-Topology) and a DC/DC transducer or several parallel DC/DC transducers between the energy store 10 and the intermediate connection circuit 40 for DC charging. If the switch 70 is open, the circuit forms a motor converter which drives the motor 80. If the switch 70 is closed and the DC intermediate circuit 40 is connected to a DC source 20, the circuit may include several parallel buck converters which may be used for DC charging. The power transferable with DC charging may thus reach a multiple of the electrical drive power, with no over-dimensioning of the power electronics. In contrast to [3], switching from the motor to DC charge operation is possible by using the boost converter between the intermediate connection circuit and the energy store 10 with no additional separation of the energy store 10 from the intermediate connection circuit.

Although some aspects have been described in connection with a device, it is to be understood that these aspects also represent a description of the corresponding method so that a block or element of a device is to be understood to be also a corresponding method step or feature of a method step. In analogy, aspects having been described in connection with or as a method step, also represent a description of a corresponding block or detail or feature of a corresponding device. Some or all the method steps may be performed by a hardware apparatus (or using a hardware apparatus), like a microprocessor, a programmable computer or electronic circuit, for example. In some embodiments, some or several of the most important method steps may be performed by such an apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

Sources

[1] Highly efficient and Compact DC_DC Converter for Ultra-Fast Charging of electric Vehicles", D. Christen, S. Tschannen, J. Biela, ETH Zürich, 15$^{th}$ International Power Electronics and Motion Control Conference, EPE-PEMC 2012 ECCE Europe, Novi Sad, Serbia

[2] "Automotive Powertrain DC/DC Converter with 25 kW/dm$^3$ by using SiC Diodes.", B. Eckardt, A. Hofmann, S. Zeltner, M. Maerz, Fraunhofer Institut of integrated Systems and Device technology (IISB), Erlangen

[3] Integrated electric Motor Drive and Power Electronics for Bidirectional Power Flow between the electric Vehicle and DC or AC grid", Mehnaz Akhter Khan, Iqbal Husain, North Carolina State University, Raleigh, N.C., USA and Yilmaz Sozer, University of Akron, Ohio, USA IEEE TRANSACTIONS ON POWER ELECTRONICS; VOL. 28, NO. 12, DECEMBER 2013

The invention claimed is:

1. A device for charging an energy store, comprising:
a first terminal for connecting to a direct current source;
a second terminal for connecting to the energy store;
a third terminal for connecting to an alternating current source; and
a parallel connection between the first and second terminals, the parallel connection comprising an intermediate connection circuit, a first transducer circuit for converting an input voltage and an input current to an output direct voltage and an output direct current, and a second transducer circuit;
wherein the first transducer circuit comprises an AC/DC transducer comprising a switch connected between a main choke and a grid choke of the AC/DC transducer;
wherein the switch is configured to separate the grid choke from the main choke and to connect the main choke to the second terminal in a direct current charge mode; and
wherein the AC/DC transducer comprises a series connection of the grid choke, the switch and the main choke, and wherein the grid choke is connected to the third terminal;
wherein the second transducer circuit comprises a DC/DC transducer.

2. The device in accordance with claim 1, wherein the switch is configured to connect the grid choke and the main choke and to separate the main choke from the second terminal in an alternating current charge mode.

3. A device for charging an energy store, comprising:
a first terminal for connecting to a direct current source;
a second terminal for connecting to the energy store; and
a parallel connection between the first and second terminals, the parallel connection comprising an intermediate connection circuit, a first transducer circuit for converting an input voltage and an input current to an output direct voltage and an output direct current, and a second transducer circuit;
wherein the first transducer circuit comprises a motor and a switch configured to connect a winding of the motor to the second terminal in a direct current charge mode;
wherein the second transducer circuit comprises a DC/DC transducer;
wherein the winding of the motor forms a main choke of the first DC/DC transducer.

4. The device in accordance with claim 3, wherein the switch is configured to separate the winding of the motor from the second terminal in a motor operating process.

5. The device in accordance with claim 1, wherein the first transducer circuit comprises a bridge circuit between the intermediate connection circuit and the second terminal.

6. The device in accordance with claim 1, wherein the first and second transducer circuits are configured to perform multi-phase processing of a charge current of the direct current source.

7. The device in accordance with claim 3, wherein the first transducer circuit comprises a bridge circuit between the intermediate connection circuit and the second terminal.

8. The device in accordance with claim 3, wherein the first and second transducer circuits are configured to perform multi-phase processing of a charge current of the direct current source.

* * * * *